United States Patent [19]

Aoki

[11] Patent Number: 5,122,876
[45] Date of Patent: Jun. 16, 1992

[54] IMAGE SIGNAL RESTORING APPARATUS

[75] Inventor: Akio Aoki, Tokyo, Japan

[73] Assignee: Canon Kabushiki Kaisha, Tokyo, Japan

[21] Appl. No.: 612,313

[22] Filed: Nov. 13, 1990

Related U.S. Application Data

[63] Continuation of Ser. No. 454,410, Dec. 21, 1989, abandoned.

[30] Foreign Application Priority Data

Dec. 26, 1988 [JP] Japan .................. 63-326289

[51] Int. Cl.⁵ .................. H04N 7/13; H04N 11/04
[52] U.S. Cl. .................. 358/133; 358/36; 358/105
[58] Field of Search .................. 358/36, 105, 133

[56] References Cited

U.S. PATENT DOCUMENTS

| | | | |
|---|---|---|---|
| 4,107,736 | 8/1978 | Lowry | 358/36 |
| 4,618,882 | 10/1986 | Harwood | 358/36 |
| 4,630,114 | 12/1986 | Bergmann | 358/36 |
| 4,661,853 | 4/1987 | Roeder | 358/36 |
| 4,775,888 | 10/1988 | Nakagawa | 358/36 |
| 4,794,454 | 12/1988 | Sugiyama | 358/36 |
| 4,807,033 | 2/1989 | Keesen | 358/36 |
| 4,807,034 | 2/1989 | Takeuchi | 358/36 |
| 4,941,046 | 7/1990 | Motoe | 358/36 |
| 4,984,070 | 1/1991 | Tanaka | 358/36 |

Primary Examiner—Howard W. Britton
Attorney, Agent, or Firm—Robin, Blecker, Daley & Driscoll

[57] ABSTRACT

An image signal restoring apparatus of the invention is of the type in which from the luminance information signal and chrominance information signal transmitted thereto, the original luminance and chrominance signals are restored, and operates in such a manner that when it is judged that the inputted luminance information signal is usable to restore the original luminance signal and the inputted chrominance information signal is unusable to restore the original chrominance signal, the inputted luminance information signal is used to detect presence or absence of motion in the image represented by the luminance signal corresponding to the luminance information signal, and, based on the detection result, an interpolation chrominance signal is produced, whereby it becomes possible to stably restore images of high visibility and natural motion.

14 Claims, 4 Drawing Sheets

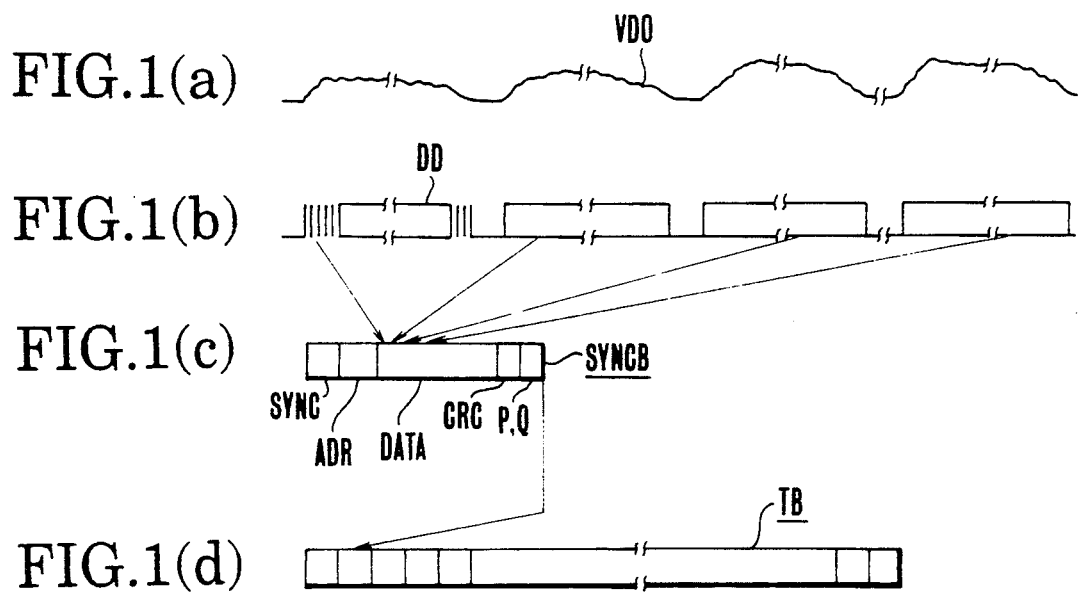
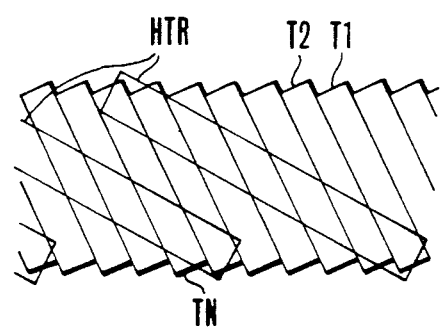
FIG.2
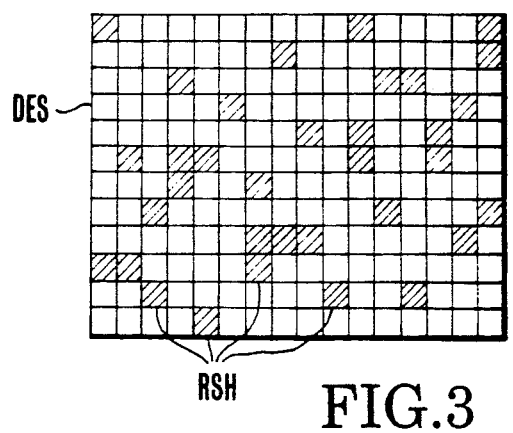
FIG.3

IMAGE SIGNAL RESTORING APPARATUS

This application is a continuation of application Ser. No. 454,410, filed Dec. 21, 1989, now abandoned.

BACKGROUND OF THE INVENTION

1. Field of the Invention

This invention relates to an image signal restoring apparatus for restoring digitized image signals.

2. Description of the Related Art

In the conventional digital VTR, when recording an image signal on a magnetic tape, the analog image signal VDb FIG. 1(a)) is converted into digital data DD (FIG. 1(b)) of, for example, 8 bits by sampling and quantizing. To avoid occurrence of a harmful effect due to burst error, shuffling or the like dispersion treatment is then applied to this digital data DD. Further, as shown in FIG. 1(c), the digital data DD is grouped into blocks by every predetermined number of units. At its head, a block synchronizing signal SYNC is added, which, in view of the deshuffling (the treatment of returning the data to the original array), is followed by an address signal ADR. For detection and correction of a transmission error, an error detection code CRC and an error correction code parity P, Q, too, are provided following the data (DATA). Thus, formation of one synchronizing block SYNCB is completed.

A plurality of synchronizing blocks SYNCB are gathered up to form one track block TB (FIG. 1(d)), and this track block TB is magnetically recorded in one track of the magnetic tape.

Since the digital VTR performs recording in such a manner, many proposals for the high-efficient coding capability have been made in order to reduce the number of data recorded per unit time (compress the band) so that video signals of long time can be recorded. One of the high-efficient coding methods is to divide the entire area of a picture into (m×n) number of picture element blocks where m and n are integers of not less than 2. By utilizing the fact that the picture elements within one individual picture element block have high correlations, the coding is carried out in each picture element block. This is known as the so-called "block coding" method. In Japanese Laid-Open Patent Application No. Sho 62-151090, for example, the data of every one picture element block are converted into a form comprising the maximum and minimum values in that block and the data is obtained by quantizing each of all the picture elements between these values. Of the coding methods, this one by the block can be said, in the point of view of limiting the propagation of an error to within the block, to be suited to the digital VTR.

The block-coded data of a plurality of picture element blocks form the above-described synchronizing block to be recorded on the magnetic tape.

By the way, for reproduction of the image signal recorded on the magnetic tape, it is usual to prepare, besides the normal reproduction mode in which the recorded image signal is reproduced with fidelity, a high-speed search mode to be used in searching the recorded images at a high speed. In the normal reproduction mode, the recorded tracks of the magnetic tape are reproduced one at a time successively, and the signal reproduced from each track is written in the field memory. It is then read out in a predetermined periodicity and applied to a TV set or like monitor. In the high-speed search mode, on the other hand, the recorded magnetic tape runs very fast (for example, 8 times) while simultaneously reproducing the recorded images. On the display, therefore, it must be made possible to exchange one reproduced image by another at the high speed.

Since, in this high-speed search mode, the reproducing head scans across a plurality of tracks T1 to TN like a locus HTR shown in FIG. 2, there are many occasions that all the data necessary to reproduce the image cannot be picked up. Even if the reproduction of the image data DATA could be performed, the failure of reproducing the address signal ADR results in the impossibility of restructuring the image data DATA of that synchronizing block SYNCB. So, it has been the common practice in the art that in the high-speed search mode not only the data obtained in a time corresponding to one field (which are assigned to the hatched parts RSH of the picture elements on the picture DES shown in FIG. 3) but also the data obtained before that are used to form an image signal for one field.

But, even this method, because of the dispersion treatment such as shuffling, leaves an opportunity for some picture elements on the display to continue displaying the same content as it is not renewed for a long time. In this case, one displayed picture is made by mixing the very old data in some elements and new data in the others. Thus, an unnatural picture would appear. Particularly in the case of motion pictures, this phenomenon is conspicuous.

Also, there would occur a particular relationship between the shuffling method and the running speed of the tape that despite the use of the old data, some picture elements are never reproduced. This takes the form of a noise bar or the like on the display, causing the reproduced picture to become unpleasant to view. This tendency becomes more conspicuous particularly when the high speed search mode is operated, or in the case of the recording method using the above-described block coding.

SUMMARY OF THE INVENTION

An object of the present invention is to provide an image signal restoring apparatus which enables the above-described problems to be solved.

Another object of the present invention is to provide an image signal restoring apparatus which can stably restore images in natural motion at a high level of visibility.

Under such objects, according to the invention, in an embodiment thereof as applied to the type of apparatus in which from the transmitted luminance information signal and chrominance information signal, the original luminance signal and chrominance signal are restored, an image signal restoring apparatus of the invention includes: first judgment means, arranged to input a luminance information signal, for judging whether an original luminance signal is restorable or not from the inputted luminance information signal; second judgment means, arranged to input a chrominance information signal, for judging whether an original chrominance signal is restorable or not from the inputted chrominance information signal; first motion detecting means, arranged to input the luminance information signal, for detecting, on the basis of the inputted luminance information signal, presence or absence of motion in an image represented by a luminance signal corresponding to the luminance information signal; second motion detecting means, arranged to input the chrominance information signal, for detecting, on the basis of the inputted chrominance information signal, presence or absence of motion in an image represented by a chrominance signal corresponding to the chrominance information signal; and interpolation chrominance signal generating means for generating, when the original luminance signal has been judged by the first judgment means to be restorable from the inputted luminance information signal and the original chrominance signal has been judged by the second judgment means to be unrestorable from the inputted chrominance information signal, an interpolation chrominance signal on the basis of a result of detection made by the first motion detecting means.

Other objects than those described above of the invention and its features will become apparent from the following detailed description of embodiments of the invention by reference to the drawings:

BRIEF DESCRIPTION OF THE DRAWINGS

FIGS. 1(a) to 1(d) are diagrams to explain the signal treating procedure of the block coding type recording method.

FIG. 2 is a diagram illustrating the tracing locus of the head relative to the tracks on the magnetic tape in the high-speed search mode.

FIG. 3 is a diagram illustrating the parts of the compartments in the picture display which are activated in the high-speed search mode.

DETAILED DESCRIPTION OF THE PREFERRED EMBODIMENT

Figure 4:
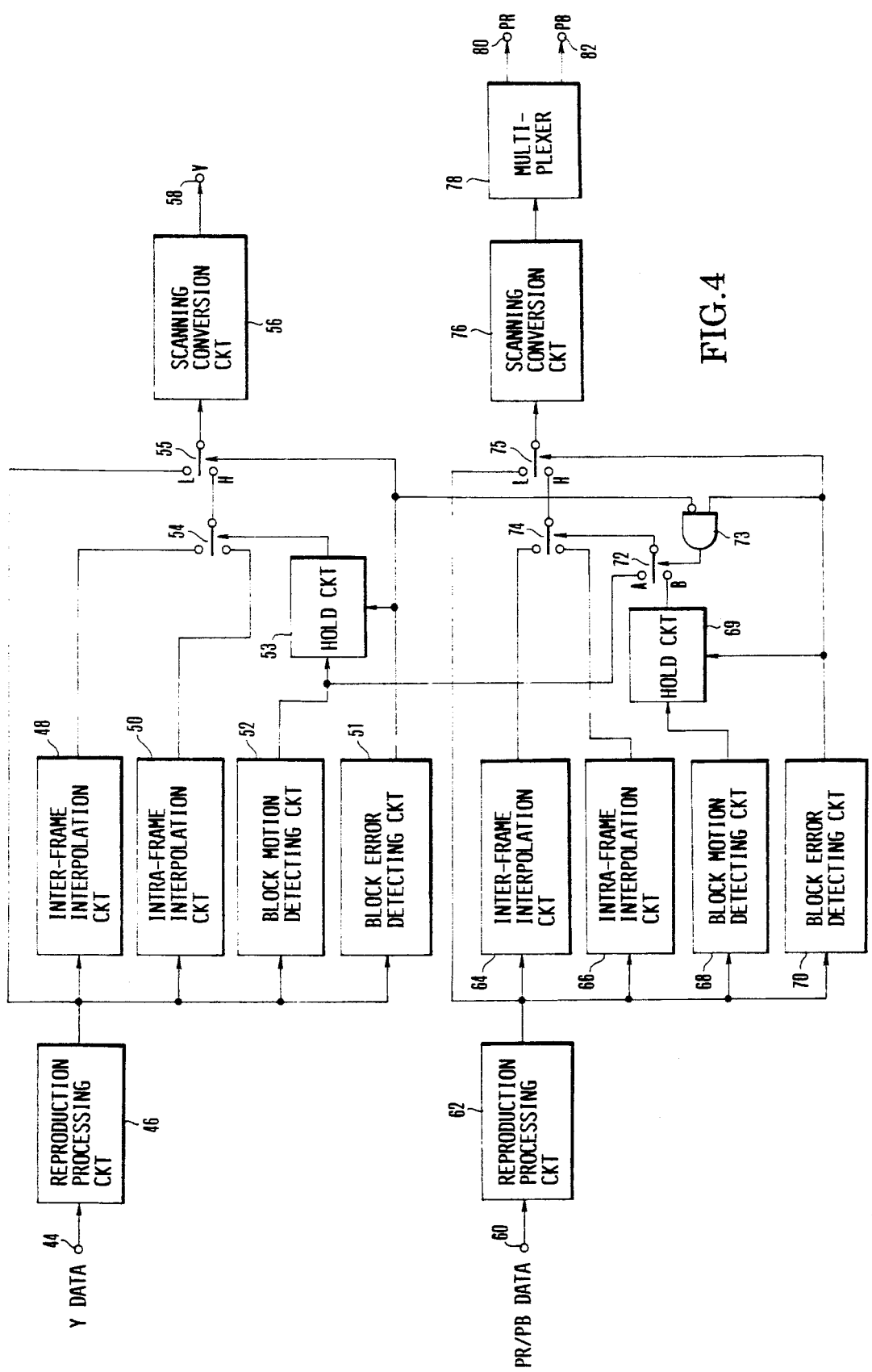
FIG. 4 is a block diagram of the construction of a reproducing apparatus to which the invention is applied as one embodiment of the invention.
Figure 5:
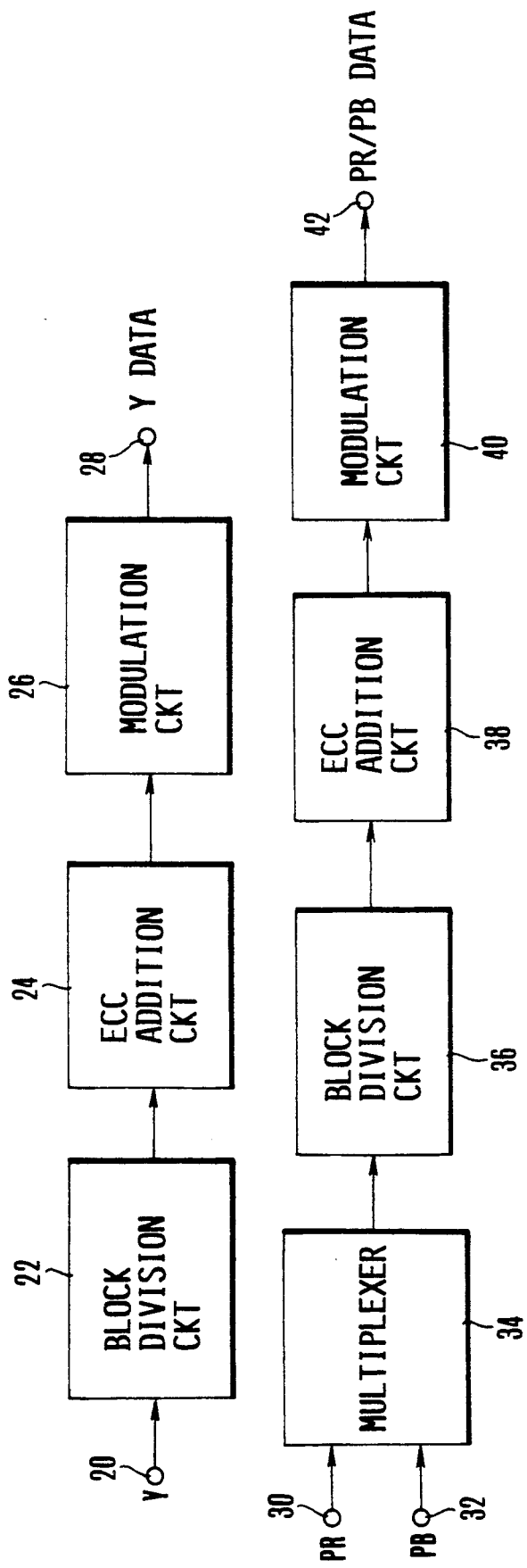
FIG. 5 is a block diagram of the construction of a recording apparatus which corresponds to the reproducing apparatus of FIG. 4.

The invention is next described by using an embodiment of the invention. FIG. 4 in block diagram shows one embodiment of the invention applied to the reproducing apparatus. The recording apparatus corresponding to the reproducing apparatus of FIG. 4 is shown in FIG. 5. How to perform the block coding is shown in FIGS. 6(a) to 6(d).

Figure 6A:
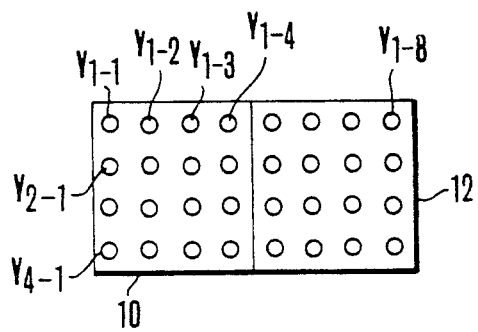
FIGS. 6(a) to 6(d) are diagrams to explain the block coding principle.
Figure 6C:
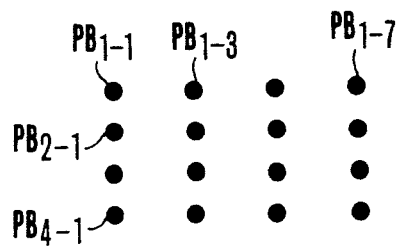
Figure 6B:
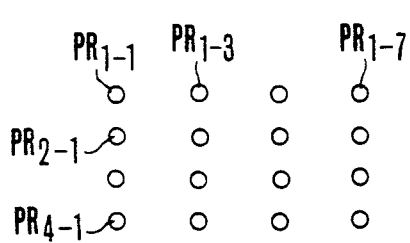
Figure 6D:
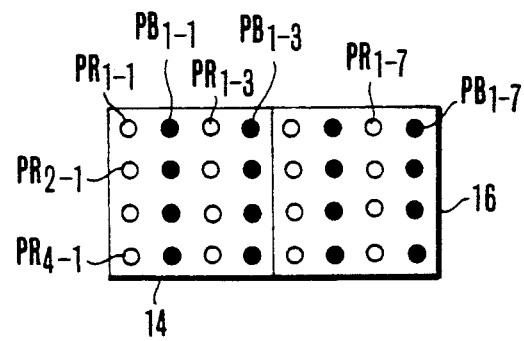

In FIG. 6(a), $Y_{1-1}, Y_{1-2}, Y_{1-3}, \ldots, Y_{2-1}, \ldots Y_{4-1}, \ldots$ are samples of a luminance signal. Since in the present embodiment an example of block coding of $4 \times 4$ picture elements is taken, blocks 10 and 12 become the coded blocks. FIG. 6(b) shows samples $PR_{1-1}, PR_{1-3}, \ldots PR_{2-1}, \ldots, PR_{4-1}, \ldots$ of a color-difference signal PR in the case of taking an example of 4:2:2 type component coding. FIG. 6(c) likewise shows another color-difference signal $PB_{1-1}, PB_{1-3}, \ldots$ FIG. 6(d) shows a manner in which the samples of the two color-difference signals PR and PB are mixed when the block coding is performed. A block 14 and another one 16 are equal in size to the blocks 10 and 12 of FIG. 6(a) and their spatial positions coincide with each other.

The recording apparatus shown in FIG. 5 is first described. The luminance signal Y is supplied to an input terminal 20, and a block division circuit 22 having a frame memory divides the luminance signal Y into blocks. The block coding operation is performed in such a manner that the samples or the luminance equal Y are put in the scanning order to, and stored in, the frame memory of the block division circuit 22 and then rearranged to the order of $Y_{1-1}, Y_{1-2}, Y_{1-3}, Y_{1-4}, Y_{2-1}, Y_{2-2}, Y_{2-3}, \ldots, Y_{4-1}, \ldots Y_{4-4}$ in every one block. Then, an ECC addition circuit 24 gives each block an error check and correction code ECC. A modulation circuit 26 then performs digital modulation suited to the head-recording medium characteristic to produce a signal to be recorded. This signal is supplied from an output terminal 28 to a recording head (not shown). The color-difference signals PR and PB are also supplied to respective input terminals 30 and 32, and the multiplexer 34 time-axially multiplexes them. After that, they are processed likewise by a block division circuit 36, an ECC addition circuit 38 and a modulation circuit 40. From an output terminal 42, a signal to be recorded is supplied to the recording head (not shown) and recorded on a magnetic tape (also not shown).

Next, the reproducing apparatus shown in FIG. 4 is described. A recording head (not shown) picks up the recorded signals from the magnetic tape. Of the reproduced data, the luminance data is supplied past an input terminal 44 to a reproduction processing circuit 46 and digital treated. In this circuit 46, after the digital demodulation, the error correction treatment is applied, and further the blocks are recovered. Thus the data are produced in the raster scanning order in units of a block. The output of the reproduction processing circuit 46 is then supplied to an inter-frame interpolation circuit 48, an intra-frame interpolation circuit 50, a block motion detecting circuit 52 and a block error detecting circuit 51. The block error detecting circuit 51 checks if the picture element block in question has any error. When an error is detected, it produces an output signal of high level. When no error is detected, it takes the low level. When this error signal is at a low level, a switch 55 is connected to its L side, so that the output of the reproduction processing circuit 46 is directly conveyed to an output line. Further, when there is an error, another switch 54 to be described later conveys the interpolation data onto the output line.

From the signal of each block output from the demodulation circuit 46, the block motion detecting circuit 52 judges whether that block represents a motion picture, or a still picture and outputs its binary information. In the case of producing the interpolation data, however, because the data used to form this binary information are erroneous, this binary information itself cannot be used. Therefore, if the output of the block error detecting circuit 51 is at a high level, the aforesaid binary information is held by a hold circuit 53, and, instead, the binary information of the adjacent block is used. In a case where the block to be output is judged to be a motion picture by this binary information, the output of the intra-frame interpolation circuit 50 is selected by the switch 54. In another case where judged to be a still picture, the output of the inter-frame interpolation circuit 48 is selected. The signal selected by the switch 54 is supplied to the H side of the switch 55, becoming the interpolation data. The output of the switch 55 is supplied to a scanning conversion circuit 56 where it is subjected to scanning conversion reverse to the block division when coding. The result appears at an output terminal 58. Thus, the original luminance data are restored.

The color-difference data PR/PB reproduced from the magnetic tape by the reproducing head (not shown) are supplied to another reproduction processing circuit 62 where they are subjected to the various treatments likewise with the luminance signal. The output of the reproduction processing circuit 62 is then supplied to an inter-frame interpolation circuit 64, an intra-frame interpolation circuit 66, a block motion detecting circuit 68 and a block error detecting circuit 70. A switch 75 is controlled by the output of the block error detecting circuit 70 similarly to the switch 55. When an error arises, the switch 74 outputs the interpolation data.

A switch 72 is arranged to select one of an output produced from the binary information obtained by the block motion detecting circuit 68 similar to the block motion detecting circuit 52 through a hold circuit 69 similar to the hold circuit 53 and an output of the block motion detecting circuit 52 for the luminance signal to be conveyed onto its output line. An AND gate 73 is used for controlling the switch 72. Only when an error arises in the color-difference block and no error arises in the luminance block, does the AND gate 73 cause the switch 72 to be connected to its A side. In other words, if a block error arises even in the luminance block of the same position as that of the color-difference block to be interpolated, then similarly to the luminance data, the switch 74 is changed over according to the output of the hold circuit 69 concerning the binary information of the adjacent block from the block motion detecting circuit 68, so that the inter-frame interpolation circuit 64 or the intra-frame interpolation circuit 66 is selected. Meanwhile, when no block error arises in the luminance block of the same position, the switch 72 is moved to the output side of the block motion detecting circuit 52. By this, the motion of that block is judged by the luminance signal. Even if the color-difference data have an error, there is a possibility that the luminance data have no error. Hence, the accuracy of selection of the inter-frame interpolation and the intra-frame interpolation increases. Therefore, an advantage of improving the image quality to a higher level can be expected.

It should be noted that though not shown in FIG. 4, a buffer is used to adjust the timing of the outputs of the various circuit portions, so that, for example, the luminance block output from the reproduction processing circuit 46 and the color-difference block output from the reproduction processing circuit 62 take the same position on the picture. Also, each portion is provided with a buffer so that the outputs of the inter-frame interpolation circuit 48, the intra-frame interpolation circuit 50, the block motion detecting circuit 52 and the block error detecting circuit 51 all become relevant to the same block as that of the luminance signal inputted to the L terminal of the switch 55. This holds even on the color-difference signals.

As is understandable from the foregoing description, in the present embodiment, even if the number of reproducible picture elements is few, an image of high visibility and natural motion can be obtained by using relatively simple hardware.

What is claimed is:

1. An image signal restoring apparatus for restoring an original luminance signal and chrominance signal from a transmitted luminance information signal and chrominance information signal, comprising:
   (A) first judgment means, arranged to input a luminance information signal, for judging whether an original luminance signal is restorable or not from the inputted luminance information signal;
   (B) second judgment means, arranged to input a chrominance information signal, for judging whether an original chrominance signal is restorable or not from the inputted chrominance information signal;
   (C) first motion detecting means, arranged to input the luminance information signal, for detecting, on the basis of the inputted luminance information signal, presence or absence of motion in an image represented by a luminance signal corresponding to the luminance information signal;
   (D) second motion detecting means, arranged to input the chrominance information signal, for detecting, on the basis of the inputted chrominance information signal, presence or absence of motion in an image represented by a chrominance signal corresponding to the chrominance information signal; and
   (E) interpolation chrominance signal generating means for generating, when the original luminance signal has been judged by said first judgment means to be restorable from the inputted luminance information signal and the original chrominance signal has been judged by said second judgment means to be unrestorable from the inputted chrominance information signal, an interpolation chrominance signal on the basis of a result of detection made by said first motion detection means.

2. An apparatus according to claim 1, wherein said interpolation chrominance signal generating means includes:
   (1) first interpolation means for generating an interpolation chrominance signal by using a chrominance signal included in the same picture as that including a chrominance signal corresponding to a chrominance information signal from which an original chrominance signal is unrestorable;
   (2) second interpolation means for generating an interpolation chrominance signal by using a chrominance signal included in a picture different from that including a chrominance signal corresponding to a chrominance information signal from which an original chrominance signal is unrestorable; and
   (3) selection output means for selecting and outputting one of the interpolation chrominance signal generated by said first interpolation means and the interpolation chrominance signal generated by said second interpolation means on the basis of a result of detection made by said first motion detecting means.

3. An apparatus according to claim 1, further comprising:
   (1) interpolation luminance signal generating means for generating, when the original luminance signal has been judged by said first judgment means to be unrestorable from the inputted luminance information signal, an interpolation luminance signal on the basis of a result of detection made by said first motion detecting means.

4. An apparatus according to claim 3, wherein said interpolation luminance signal generating means includes:
   (1) first interpolation means for generating an interpolation luminance signal by using a luminance signal included in the same picture as that including a luminance signal corresponding to a luminance information signal from which an original luminance signal is unrestorable;
   (2) second interpolation means for generating an interpolation luminance signal by using a luminance signal included in a picture different from that including a luminance signal corresponding to a luminance information signal from which an original luminance signal is unrestorable; and (3) selection output means for selecting and outputting one of the interpolation luminance signal generated by said first interpolation means and the interpolation luminance signal generated by said second interpolation means on the basis of a result of detection made by said first motion detecting means.

5. An image signal restoring apparatus for restoring an original luminance signal and chrominance signal from a transmitted luminance information signal and chrominance information signal, comprising:

(A) detecting means for detecting presence or absence of motion in an image represented by an original luminance signal corresponding to said transmitted luminance information signal; and (B) interpolation processing means for effecting interpolation processing on the basis of a result of detection made by said detecting means.

6. An apparatus according to claim 5, wherein said interpolation processing means is arranged to effect interpolation processing in a case where it is impossible to restore the original chrominance signal from said transmitted chrominance information signal.

7. An apparatus according to claim 5, wherein said interpolation processing means is arranged to effect interpolation processing, on the basis of a result of detection made by said detecting means, in a case where it is possible to restore the original luminance signal from said transmitted luminance information signal.

8. An apparatus according to claim 5, wherein said detecting means is further arranged to detect presence or absence of motion in an image represented by an original chrominance signal corresponding to said transmitted chrominance information signal.

9. An apparatus according to claim 8, wherein said interpolation processing means is arranged to effect interpolation processing, on the basis of presence or absence of motion in the image represented by an original chrominance signal detected by said detecting means, in a case where it is impossible to restore the original luminance signal from said transmitted luminance information signal.

10. An image signal restoring apparatus for restoring original luminance signal and chrominance signal from transmitted luminance information signal and chrominance information signal, comprising:

(A) detecting means for detecting presence or absence of a motion in an image represented by said original luminance signal corresponding to said transmitted luminance information;

(B) first interpolating means for effecting interpolation processing by using the original chrominance signal included in a same picture;

(C) second interpolating means for effecting interpolation processing by using the original chrominance signal included in a different picture; and (D) selection means for selecting one of the first interpolation means and the second interpolation means depending upon a result of detection made by said detecting means.

11. An apparatus according to claim 10, wherein said first and second interpolating means are arranged to effect the interpolation processing in the case where it is impossible to restore the original chrominance signal from said transmitted chrominance information signal.

12. An apparatus according to claim 10, wherein said selection means is arranged to select either one of said first interpolating means or said second interpolating means depending upon the result of detection made by said detecting means, in the case where it is possible to restore the original luminance signal form said transmitted luminance information signal.

13. An apparatus according to claim 10, wherein said detecting means is further arranged to detect presence or absence of the motion in the image represented by said original chrominance signal corresponding to said transmitted chrominance information signal.

14. An apparatus according to claim 13, wherein said selection means is arranged to select either one of said first interpolating means or said second interpolating means depending upon the presence or absence of the motion in the image represented by said original chrominance signal detected by said detecting means, in the case where it is impossible to restore the original luminance signal from said transmitted luminance information signal.

* * * * *